(12) United States Patent
Smith et al.

(10) Patent No.: US 6,177,515 B1
(45) Date of Patent: Jan. 23, 2001

(54) POLYPROPYLENE GRAFT COPOLYMERS WITH IMPROVED SCRATCH AND MAR RESISTANCE

(75) Inventors: Jeanine A. Smith, West Chester, PA (US); Dominic A. Berta; Nitya P. Khasat, both of Newark, DE (US); Jay S. Rosenthal, West Chester, PA (US)

(73) Assignee: Montell Technology Company BV (NL)

( * ) Notice: Under 35 U.S.C. 154(b), the term of this patent shall be extended for 0 days.

(21) Appl. No.: 09/213,576

(22) Filed: Dec. 17, 1998

(51) Int. Cl.[7] ............................ C08L 23/10; C08L 23/16; C08K 3/36
(52) U.S. Cl. ............................ 525/70; 525/64; 525/78
(58) Field of Search .................. 525/70, 64, 78

(56) References Cited

U.S. PATENT DOCUMENTS

| | | | |
|---|---|---|---|
| 4,199,622 | 4/1980 | Kokumai et al. | 427/239 |
| 4,362,844 | 12/1982 | Lemstra et al. | 525/57 |
| 5,079,281 | 1/1992 | Takeuchi et al. | 523/212 |
| 5,155,160 | 10/1992 | Yeh et al. | 524/487 |
| 5,262,471 | 11/1993 | Akao | 524/496 |
| 5,286,791 | * 2/1994 | DeNicola, Jr. et al. | 525/71 |
| 5,919,861 | * 7/1999 | Kazmaier et al. | 525/26 |
| 5,973,070 | * 10/1999 | Baann | 525/70 |

FOREIGN PATENT DOCUMENTS 832925    4/1998   (EP) .

* cited by examiner

Primary Examiner—James J. Seidleck
Assistant Examiner—Olga Asinovsky

(57) ABSTRACT

A polymer composition with improved scratch and mar resistance contains (1) a graft copolymer comprising a backbone of a propylene polymer material having graft polymerized thereto at least one vinyl monomer capable of being polymerized by free radicals, and (2) an additive selected from the group consisting of (a) about 0.5% to about 10% of at least one low molecular weight ethylene polymer or a functionalized derivative thereof, and (b) a combination of (i) about 0.5% to about 10% of at least one of the low molecular weight ethylene polymers in (a) and (ii) about 0.5% to about 10% of inorganic microspheres, based on the total weight of the composition. Optionally the composition can also contain a compatibilizing agent such as an unsaturated carboxylic acid-functionalized propylene polymer material. The composition can optionally contain about 2% to about 30% of one or more rubber components, about 15% to about 50% of a broad molecular weight distribution propylene polymer material, or a combination of the two.

15 Claims, No Drawings

POLYPROPYLENE GRAFT COPOLYMERS WITH IMPROVED SCRATCH AND MAR RESISTANCE

FIELD OF THE INVENTION

This invention relates to compositions comprising a graft copolymer of a propylene polymer material, to which one or more vinyl monomers are graft polymerized.

BACKGROUND OF THE INVENTION

Molded articles made from polyolefins tend to have poor scratch and mar resistance. That is, the surface is easily marred or scratched by lightly rubbing with an object such as a fingernail. Articles made from modified polyolefins, for example, propylene polymer materials grafted with one or more vinyl monomers such as styrene and acrylic compounds, also exhibit poor scratch and mar resistance. When rubber is added to these graft copolymers, the scratch and mar resistance of articles made therefrom usually deteriorate.

The scratch and mar resistance of thermoplastic olefins, which are uncrosslinked blends of crystalline olefin polymers and olefin polymer elastomers, was improved by adding a lubricant such as a polysiloxane, either alone or in combination with an aliphatic amide such as erucamide and/or oleamide, as disclosed in European Patent Application 832,925.

There is a need for improving the scratch and mar resistance of a graft copolymer comprising a backbone of a propylene polymer material to which are grafted polymerized vinyl monomers, while still maintaining a good balance of mechanical properties and high surface gloss.

SUMMARY OF THE INVENTION

The composition of this invention comprises (1) a graft copolymer comprising a backbone of a propylene polymer material having graft polymerized thereto at least one vinyl monomer capable of being polymerized by free radicals, wherein the polymerized monomers are present in an amount of about 10 to about 120 parts per hundred parts of the propylene polymer material, and (2) an additive selected from the group consisting of (a) about 0.5% to about 10% of at least one low molecular weight ethylene polymer or a functionalized derivative thereof having a number average molecular weight of about 300 to about 5000, and (b) a combination of (i) about 0.5% to about 10% of at least one of the low molecular weight ethylene polymers in (a) and (ii) about 0.5% to about 10% of inorganic microspheres, based on the total weight of the composition. Optionally the composition can also contain a coupling agent such as an unsaturated carboxylic acid-functionalized propylene polymer.

The composition optionally contains about 2% to about 30% of one or more rubber components, about 15% to about 50% of a broad molecular weight distribution propylene polymer material, or a combination of the two.

Molded articles made from these compositions have a glossy surface that is much more resistant to scratching and marring than typical graft copolymers of the type described above.

DETAILED DESCRIPTION OF THE INVENTION

Component (1) of the composition of this invention is a graft copolymer, comprising a backbone of a propylene polymer material having graft polymerized thereto at least one vinyl monomer capable of being polymerized by free radicals.

The propylene polymer material that is used as the backbone of the graft copolymer can be:

(1) a homopolymer of propylene having an isotactic index greater than 80, preferably about 85 to about 99;

(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
  (a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a 4–8 C alpha-olefin that is insoluble in xylene at ambient temperature; and
  (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in tetrahydronaphthalene at 135° C., of about 1.5 to about 4.0 dl/g,
  wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60%, preferably about 30% to about 50%, of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, and most preferably about 200 to about 1000 MPa.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized in the presence of (a) to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The monomers that can be grafted onto the backbone of propylene polymer material can be any monomeric vinyl compound capable of being polymerized by free radicals, wherein the vinyl radical $H_2C=CR-$, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acids and their derivatives, including acrylonitrile; methacrylonitrile; acrylamide; methacrylamide; acrylic acid; acrylate esters such as the methyl, ethyl, hydroxyethyl, 2-ethylhexyl, and butyl acrylate esters; methacrylic acid; ethacrylic acid; methacrylate esters, such as the methyl, ethyl, butyl, benzyl, phenylethyl, phenoxyethyl, epoxypropyl, and hydroxpropyl methacrylate esters; maleic anhydride, and N-phenyl maleimide. Multiple monomers from the same or different classes can be employed. Methyl methacrylate and methyl acrylate, or methyl methacrylate and methacrylic acid, wherein the methyl acrylate or methacrylic acid is present in an amount of about 0.5% to about 10%, based on the total weight of the monomers, are the preferred grafting monomers.

The polymerized monomers comprise about 10 to about 120 parts per hundred parts of the propylene polymer material, preferably about 30 to about 95 pph.

During the graft polymerization, the monomers also polymerize to form a certain amount of free or ungrafted polymer. The morphology of the graft copolymer is such that the propylene polymer material is a continuous or matrix phase, and the polymerized monomer, both grafted and ungrafted, is a dispersed phase.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide and a vinyl monomer is described in more detail in U.S. Pat. No. 5,140,074, which is incorporated herein by reference. Preparation of graft copolymers by irradiating an olefin polymer and then treating with a vinyl monomer is described in more detail in U.S. Pat. No. 5,411,994, which is incorporated herein by reference.

Component (2) of the composition of this invention can be at least one low molecular weight ethylene polymer having a number average molecular weight ($M_n$) of about 300 to about 5000. Functionalized derivatives of these ethylene polymers, such as the hydroxylated or ethoxylated derivatives or phosphate esters thereof, or primary carboxylic acid derivatives or maleic acid-grafted linear ethylene polymers, can also be used. The ethylene polymer, or a combination of ethylene polymers, is present in an amount of 0.5% to about 10%, preferably about 2% to about 5%, based on the total weight of the composition.

Component (2) can also be a combination of (i) about 0.5% to about 10% of at least one of the low molecular weight ethylene polymers described above and (ii) about 0.5% to about 10%, preferably about 1% to about 5%, based on the total weight of the composition, of inorganic microspheres. The inorganic microspheres can be, for example, a silica-alumina ceramic alloy, an alkali aluminosilicate ceramic, or glass, and can optionally be coated with a sizing agent such as an aminosilane.

The composition can also contain a compatibilizing agent such as polypropylene modified with an α, β-unsaturated carboxylic acid or alicyclic carboxylic acid and derivatives thereof such as acrylic acid, methacrylic acid, maleic acid, fumaric acid, itaconic acid, endocyclo(2,2,1)-5-heptene-2,3-carboxylic acid and cis-4-cyclohexane-1,2-carboxylic acid, and anhydrides, esters, amides, and imides thereof. Polypropylenes modified with various amounts of maleic anhydride or maleic acid are preferred and are available commercially, for example, from Eastman Chemical Company and Aristech Chemical Corporation. The modified polypropylenes generally contain about 0.2% to about 10% of maleic acid or maleic anhydride, based on the total weight of the modified polymer. When present, the compatibilizing agent is used in an amount of about 0.2% to about 4%, preferably about 0.5% to about 2%, based on the total weight of the composition.

Optionally, the composition can also contain about 2% to about 30%, preferably about 5% to about 30%, based on the total weight of the composition, of one or more rubber components, and/or about 15% to about 50%, preferably about 40% to about 50%, based on the total weight of the composition, of a broad molecular weight distribution propylene polymer material.

The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable impact modifiers include, for example, Engage 8150 or Engage 8200 ethylene/octene-1 copolymers commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG1901X styrene/ethylene-butene-1/styrene triblock copolymer rubber modified with maleic anhydride, commercially available from Shell Chemical Company.

Another optional ingredient is a broad molecular weight distribution propylene polymer material (BMWD PP) having a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

Other additives such as pigments, nucleating agents, pigment dispersing aids, primary and secondary antioxidants, light stabilizers, acid scavengers, slip agents, and fillers such as talc, calcium carbonate, and wollastonite can also be present in the composition.

The compositions of this invention can be formed into useful articles by methods known in the art including thermoforming, injection molding, sheet extrusion, profile extrusion, and blow molding.

The test methods used to evaluate the molded specimens were:

| | |
|---|---|
| Izod impact | ASTM D-256A |
| Tensile strength | ASTM D-638-89 |
| Elongation to yield | ASTM D-638-89 |
| Elongation to break | ASTM D-638-89 |
| Flexural modulus | ASTM D-790-86 |

| | |
|---|---|
| Flexural strength | ASTM D-790-86 |
| Melt flow rate (230° C., 2.16 kg) | ASTM D-1238 |

Scratch and mar resistance were measured using Ford Laboratory Test Method BN 108-13 (resistance to scratching). The apparatus included several weighted pins that rested on the surface of the test specimen. The pins used for the scratch test were 1.0 mm highly polished steel balls and the pins used for the mar test were 7.0 mm balls. The pins were loaded with different weights exerting the following standard forces on the surface of the test material: 7.0 Newtons (N); 6.0 N; 3.0 N; 2.0 N; 0.6 N. The pins were then pulled along the panel. All scratch lines were examined and rated according to a rating scale of 1 to 5, with 1=no scratch line at all and 5=severe scratching. Improvement relative to the control was the criteria for acceptable results. A black pigmented test specimen was used because experience indicated that scratching was easier to see with the naked eye on a black surface than on surfaces of other colors.

All gloss readings were taken with a 20 degree gloss meter from a smooth (ungrained) sample.

The Chrysler crocking gloss test was carried out according to Chrysler laboratory procedure LP-463PB-54-01 using an Atlas AATCC Mar Tester, Model CM-5. Dry Bon-Ami cleanser was applied to half of a 4"×6" molded plaque. The cylindrical acrylic finger on the Mar Tester was covered with a 2"×2" piece of 14-9956-000 green felt cloth commercially available from Atlas Electric Devices Company. The cleanser-coated plaque was rubbed with the wool cloth ten times (ten double strokes). The 20° gloss was measured at several places on the marred and unmarred areas of the plaque. The maximum gloss value on the unmarred area is referred to as the original gloss. The minimum gloss of the marred area is referred to as the marred gloss. % Gloss retention, or mar resistance, is the marred gloss divided by the original gloss×100.

The Ford crocking gloss test was carried out according to Ford laboratory test method BI 161-01, Mar Resistance Determination for Automotive Coatings, using an Atlas AATCC Mar Tester, Model CM-5. A 50 mm×50 mm square of 281Q Wetordry Production Polishing Paper, commercially available from Minnesota Mining and Manufacturing Company (3 μm grade rather than the standard 2 μm grade), was placed over a similar size square of 14-9956-000 green felt commercially available from Altas Electric Devices Co., with the abrasive side of the polishing paper facing outward. The two squares were mounted over the finger of the mar tester, keeping the felt between the finger and the polishing paper. The mar tester had a cylindrical acrylic, brass or wooden finger 16 mm in diameter and exerted a force of 9 N on the test surface and had a stroke of approximately 100 mm. After the 20° gloss of the surface to be tested was measured, the surface was subjected to 10 double strokes of the mar tester. The 20° gloss of the abraded area was measured in a direction parallel to the rubbing stroke of the mar tester, and the lowest reading was recorded. The % gloss retention, or mar resistance, is the 20° gloss of the abraded area divided by the original 20° gloss×100.

Isotactic index is defined as the per cent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in tetrahydronaphthalene at 135° C.

In all of the following examples, ASTM T-bars were conditioned at 23° C. and 50% relative humidity for 48 to 96 hours before testing. Before molding the plaques for scratch/mar testing, the extruded pellets of each sample were dried at ~175° F. (80° C.) for a minimum of one hour, but usually overnight. The molded plaques for scratch/mar testing were aged at ambient temperature and humidity for at least 48 hours before testing.

In this specification, all parts and percentages are by weight unless otherwise noted.

EXAMPLE 1

This example describes the effect of a low molecular weight polyethylene on the scratch and mar resistance of a composition containing 5% rubber and a graft copolymer comprising a propylene homopolymer backbone to which was grafted a methyl methacrylate/methyl acrylate copolymer (MMA/MeAc).

In this and the following examples the propylene homopolymer used as the backbone polymer had the following properties: spherical form, melt flow rate (MFR) of 9.8 dg/min at 230° C. and 2.16 kg, and 96.1% insoluble in xylene at room temperature.

The monomers (95.6% MMA and 4.4% MeAc, based on the total weight of monomers) were grafted onto the polypropylene backbone at a grafting temperature of 114° C. using the previously described peroxide-initiated graft polymerization process. Ninety-five parts by weight of monomers were added per 100 parts of polypropylene. Lupersol PMS 50% t-butyl peroxy-2-ethyl hexanoate in mineral spirits, commercially available from Elf Atochem, was used as the peroxide initiator. The monomers were fed at a rate of 1 pph/min for 95 minutes. A monomer to initiator molar ratio of 120 was used. After the addition of monomers the temperature was raised to 140° C. for 60 to 120 minutes under a nitrogen purge until the amount of unreacted MMA in the product is <500 parts per million.

The graft copolymer was blended with a broad molecular weight distribution polypropylene (BMWD PP) having a MFR of 1.36 g/10 min, commercially available from Montell USA Inc. The amount of BMWD PP used for each sample is given in Table 1. Enough BMWD PP was added to adjust the effective add level to 30 pph of polymerized monomers per hundred parts of polypropylene (BMWD PP plus the polypropylene backbone polymer).

The rubber was Engage 8150 ethylene/octene copolymer containing 25% octene and is commercially available from DuPont-Dow Elastomers. The polyethylene wax was Polywax 3000 polyethylene (PE), a fully saturated homopolymer having a melting point of 129° C. and a number average molecular weight ($M_n$) of 3000, and is commercially available from Baker Petrolite, Polymers Division.

The UV stabilizer master batch contained 0.05% by weight Pationic 1240 modified calcium salt derived from lactic acid, commercially available from Patco Polymer Additives Division, American Ingredients Company; 0.10% Irganox 1010 antioxidant, which is tetrakis[methylene(3,5-di-tert-butyl-4-hydroxyhydrocinnamate)]methane; 0.10% Irgafos 12 antioxidant, which is 2,2',2"-nitrilo triethyl-tris [3,3',5',5'-tetra-tert-butyl-1,1'-biphenyl-2,2'-diyl]phosphite; 0.30% Tinuvin 328 antioxidant, which is 2-(2-hydroxy-3,5-di-tert-amylphenyl)-2H-benzotriazole; 0.25% Tinuvin 770 antioxidant, which is bis(2,2,6,6-tetramethyl-4-piperidinyl) sebacate, and 0.25% Chimassorb 119 antioxidant, all commercially available from Ciba Specialty Chemicals Corporation.

The pigment was 191067 black color concentrate, commercially available from Ampacet Corporation. The amount shown in the table is expressed as parts per hundred parts of uncolored formulation.

The samples were compounded on a 40 mm co-rotating, intermeshing Werner-Pfleider twin screw extruder. Each sample was extruded as pellets.

Test bars were molded on a 14 oz. Van Dorn injection molding machine at a melt temperature of ~440° F. and a mold temperature of 140° F. The results are shown in Table 1.

Plaques for scratch/mar testing (4"×6"×125 mil) were molded on a 5 oz. Battenfeld injection molding machine at a barrel temperature of 460° F. and a mold temperature of 180° F. at an injection speed of 0.2"/sec. The results are shown in Table 1.

TABLE 1

| Sample | Comp. 1 | 1 |
|---|---|---|
| Graft copolymer type | MMA/MeAc | MMA/MeAc |
| Graft copolymer (wt. %) | 44.50 | 42.13 |
| BMWD PP (wt. %) | 49.45 | 46.82 |
| Rubber (wt. %) | 5.00 | 5.00 |
| Polyethylene wax (wt. %) | 0 | 5.00 |
| Stabilizer master batch (wt. %) | 1.05 | 1.05 |
| Black pigment (pph) | 3 | 3 |
| Notched Izod (ft-lb/in) | 1.3 | 1.2 |
| Tensile strength (psi) | 4904 | 5042 |
| Elongation to break (%) | 174 | 57 |
| Flexural modulus (0.05"/min) (kpsi) | 226 | 236 |
| Flexural strength (0.05"/min) (psi) | 6784 | 6956 |
| Initial gloss (20° C.) (%) | 78.3 | 81.6 |
| Chrysler crocking gloss (20°) (%) | 1.3 | 23 |
| Gloss retention (%) | 1.7 | 28.2 |
| Ford crocking gloss (20°) (%) | 1 | 6 |
| Gloss retention (%) | 2 | 7 |
| Ford 5 finger scratch (7,6,3,2,0.6 N) | 55433 | 44332 |
| Ford 5 finger mar (7,6,3,2,0.6 N) | 45433 | 23232 |

The data show that scratch and mar resistance are improved by the addition of the low molecular weight ethylene polymer while maintaining a good balance of physical properties.

EXAMPLE 2

This example describes the effect of a low molecular weight polyethylene, or a combination of a low molecular weight polyethylene and ceramic microspheres, on the scratch and mar resistance of a composition containing 10% rubber and a graft copolymer comprising a propylene homopolymer backbone to which was grafted a MMA/MeAc copolymer.

The graft copolymer was prepared as described in Example 1.

The graft copolymer was blended with the BMWD PP as described in Example 1. The ceramic microspheres were X-155 Zeeospheres, a silica-alumina ceramic alloy in which 90% by volume of the sample has a particles size of ≦7.0–10 μm. The microspheres were treated with Union Carbide A1100 sizing agent and are commercially available from Zeelan Industries, Inc. All of the other components of the compositions were the same as described in Example 1.

The samples were compounded and molded as described in Example 1, except that the melt temperature during molding of the test bars was 460° F. The results of the physical property testing and the scratch and mar testing are given in Table 2.

TABLE 2

| Sample | Comp. 1 | 1 | Comp. 2 | Comp. 3 | 2 | 3 |
|---|---|---|---|---|---|---|
| Graft copolymer type | MMA/MeAc | MMA/MeAc | MMA/MeAc | MMA/MeAc | MMA/MeAc | MMA/MeAc |
| Graft copolymer (wt. %) | 42.13 | 39.76 | 39.76 | 37.40 | 37.40 | 35.03 |
| BMWD PP PP (wt. %) | 46.82 | 44.19 | 44.19 | 41.55 | 41.55 | 38.92 |
| Rubber (wt. %) | 10.00 | 10.00 | 10.00 | 10.00 | 10.00 | 10.00 |
| Polyethylene wax (wt. %) | 0 | 5.00 | 0 | 0 | 5.00 | 5.00 |
| Ceramic microspheres (wt. %) | 0 | 0 | 5.00 | 10.00 | 5.00 | 10.00 |
| Stabilizer master batch (wt. %) | 1.05 | 1.05 | 1.05 | 1.05 | 1.05 | 1.05 |
| Black pigment (pph) | 3 | 3 | 3 | 3 | 3 | 3 |
| Notched Izod (ft-lb/in) | 3.2 | 3.9 | 1.7 | 1.6 | 1.6 | 1.7 |
| Tensile strength (psi) | 4583 | 4700 | 4532 | 4304 | 4578 | 4370 |
| Elongation to break (%) | 194 | 145 | 176 | 173 | 166 | 162 |
| Flex. modulus (0.05"/min) (kpsi) | 209 | 216 | 212 | 209 | 213 | 212 |
| Flex. strength (0.05"/min) (psi) | 6164 | 6305 | 6162 | 5947 | 6162 | 5993 |
| Initial gloss (20°) (%) | 79.3 | 78.3 | 75.2 | 69.7 | 75 | 65 |
| Chrysler crocking gloss (20°) (%) | 0.5 | 39 | 5 | 5 | 60 | 55 |
| Gloss retention (%) | 0.6 | 49.8 | 6.6 | 7.2 | 80.0 | 84.6 |
| Ford crocking gloss (20°) (%) | 3 | 5 | 1 | 1 | 12 | 13 |
| Gloss retention (%) | 4 | 6 | 1 | 1 | 16 | 20 |
| Ford 5 finger scratch (7,6,3,2,0.6 N) | 55433 | 34222 | 44322 | 44332 | 34222 | 34222 |
| Ford 5 finger mar (7,6,3,2,0.6 N) | 44422 | 22222 | 44322 | 33322 | 23332 | 23221 |

The data show that scratch and mar resistance are improved by the addition of the low molecular weight ethylene polymer or a combination of the ethylene polymer and the ceramic microspheres, while maintaining a good balance of physical properties.

EXAMPLE 3

This example describes the effect of a low molecular weight polyethylene, or a combination of a low molecular weight polyethylene and ceramic microspheres, on the scratch and mar resistance of a composition containing 10% rubber and a graft copolymer comprising a propylene homopolymer backbone to which was grafted a methyl methacrylate/methacrylic acid (MMA/MAA) copolymer.

The graft copolymer was prepared as described in Example 1, except that MAA was 10 wt. % of the total monomer charge.

The graft copolymer was blended with the BMWD PP as described in Example 1. The ceramic microspheres were described in Example 2. All of the other components of the compositions were the same as described in Example 1.

The samples were compounded and molded as described in Example 1, except that the melt temperature during molding of the test bars was 460° F. The results of the physical property testing and the scratch and mar testing are given in Table 3.

TABLE 3

| Sample | Comp. 1 | 1 | Comp. 2 | Comp. 3 | 2 | 3 |
|---|---|---|---|---|---|---|
| Graft copolymer type | MMA/MeAc | MMA/MeAc | MMA/MeAc | MMA/MeAc | MMA/MeAc | MMA/MeAc |
| Graft copolymer (wt. %) | 42.13 | 39.76 | 39.76 | 37.40 | 37.40 | 35.03 |
| BMWD PP (wt. %) | 46.82 | 44.19 | 44.19 | 41.55 | 41.55 | 38.92 |
| Rubber (wt. %) | 10.00 | 10.00 | 10.00 | 10.00 | 10.00 | 10.00 |
| Polyethylene wax (wt. %) | 0 | 5.00 | 0 | 0 | 5.00 | 5.00 |
| Ceramic microspheres (wt. %) | 0 | 0 | 5.00 | 10.00 | 5.00 | 10.00 |
| Stabilizer master batch (wt. %) | 1.05 | 1.05 | 1.05 | 1.05 | 1.05 | 1.05 |
| Black pigment (pph) | 3 | 3 | 3 | 3 | 3 | 3 |
| Notched Izod (ft-lb/in) | 2.3 | 3.2 | 1.7 | 1.3 | 1.6 | 1.4 |
| Tensile strength (psi) | 4652 | 4642 | 4565 | 4466 | 4529 | 4394 |
| Elongation to break (%) | 215 | 151 | 194 | 105 | 81 | 112 |
| Flex. modulus (0.05"/min) (kpsi) | 217 | 217 | 216 | 222 | 217 | 219 |
| Flex. strength (0.05"/min) (psi) | 6393 | 6414 | 6313 | 6280 | 6284 | 6181 |
| Initial gloss (20°) (%) | 77.1 | 76.9 | 75.1 | 68 | 72.5 | 65.6 |
| Chrysler crocking gloss (20°) (%) | 0.6 | 18 | 3 | 4 | 62 | 45 |
| Gloss retention (%) | 0.8 | 23.4 | 4.0 | 5.9 | 85.5 | 68.6 |
| Ford crocking gloss (20°) (%) | 1 | 3 | 18 | 1 | 11 | 15 |
| Gloss retention (%) | 1 | 4 | 24 | 1 | 16 | 23 |
| Ford 5 finger scratch (7,6,3,2,0.6 N) | 44332 | 34222 | 44322 | 44222 | 34232 | 34332 |
| Ford 5 finger mar (7,6,3,2,0.6 N) | 23222 | 11111 | 23222 | 23232 | 22222 | 11111 |

The data show that scratch and mar resistance are improved by the addition of the low molecular weight ethylene polymer, or a combination of the ethylene polymer and the ceramic microspheres, while maintaining a good balance of physical properties.

EXAMPLE 4

This example describes the effect of a low molecular weight polyethylene on the scratch and mar resistance of a composition containing 20% rubber and a graft copolymer comprising a propylene homopolymer backbone to which was grafted a MMA/MeAc copolymer.

The graft copolymer was prepared as described in Example 1.

The graft copolymer was blended with the BMWD PP as described in Example 1. All of the components of the compositions were the same as described in Example 1.

The samples were compounded and molded as described in Example 1. The results of the physical property testing and the scratch and mar testing are given in Table 4.

TABLE 4

| Sample | Comp. 1 | 1 |
|---|---|---|
| Graft copolymer type | MMA/MeAc | MMA/MeAc |
| Graft copolymer (wt. %) | 37.40 | 35.03 |
| BMWD PP (wt. %) | 41.55 | 38.92 |
| Rubber (wt. %) | 20.00 | 20.00 |
| Polyethylene wax (wt. %) | 0 | 5.00 |
| Stabilizer master batch (wt. %) | 1.05 | 1.05 |
| Black pigment (pph) | 3 | 3 |
| Notched Izod (ft-lb/in) | 13.8 | 15.5 |
| Tensile strength (psi) | 3832 | 3644 |
| Elongation to break (%) | 511 | 499 |
| Flexural modulus (0.05"/min) (kpsi) | 165 | 154 |
| Flexural strength (0.05"/min) (psi) | 4907 | 4586 |
| Initial gloss (20° C.) (%) | 76.6 | 78.9 |
| Chrysler crocking gloss (20°) (%) | 0.4 | 5 |
| Gloss retention (%) | 0.5 | 6.3 |
| Ford crocking gloss (20°) (%) | 1 | 3 |
| Gloss retention (%) | 1 | 4 |
| Ford 5 finger scratch (7,6,3,2,0.6 N) | 54433 | 44332 |
| Ford 5 finger mar (7,6,3,2,0.6 N) | 55543 | 44333 |

The data show that scratch and mar resistance are improved by the addition of the low molecular weight ethylene polymer while maintaining a good balance of physical properties.

EXAMPLE 5

This example describes the effect of various types of low molecular weight ethylene polymer additives on the scratch and mar resistance of a composition containing 2.5% by weight ceramic microspheres, 1.0% of a maleated polypropylene (PP) compatibilizing agent, and a graft copolymer comprising a propylene homopolymer backbone to which was grafted a MMA/MeAc copolymer.

The graft copolymer was prepared as described in Example 1. The graft copolymer was blended with the BMWD PP as described in Example 1. The amounts of BMWD PP and the other components of the compositions are given in Table 5.

The rubber, the BMWD PP, the black pigment, and the stabilizer masterbatch were the same as in Example 1. The ceramic microspheres were X92 Zeeospheres, a silica-alumina ceramic alloy in which 90% by volume of the sample had a particle size of ≦6.0–7.4 μm. They are commercially available from Zeelan Industries, Inc. The maleic acid-grafted polypropylene (maleated PP) was Unite MP1000, commercially available from Aristech Chemical Corporation.

Polywax 3000 polyethylene (P-wax 3000) was described in Example 1. Polywax 850 polyethylene (P-wax 850) is a fully saturated homopolymer having a melting point of 107° C. and a $M_n$ of 850. Unilin 700 long chain alcohol has a melting point of 105° C. and a $M_n$ of 700 and is commercially available from Baker Petrolite, Polymers Division.

Unithox 720 ethoxylated alcohol has a melting point of 106° C. and a $M_n$ of 875 and is commercially available from Baker Petrolite, Polymers Division. Unicid 700 carboxylic acid has $M_n$=700 and a melting point of 110° C. and is commercially available from Baker Petrolite, Polymers Division. X-5005, X-2025 and X-2026 branched polyethylene waxes are available from Baker Petrolite, Polymers Division.

The samples were compounded on a 34 mm co-rotating, intermeshing Leistritz twin screw extruder at a melt temperature of 232°–237° C., a screw speed of 250 rpm, and a throughput rate of 20 lb/hr. Vacuum was used during extrusion.

Plaques for scratch and mar testing were molded on a 5 oz Battenfeld injection molding machine at a barrel temperature of 460° F. and a mold temperature of 180° F., at an injection speed of 0.2"/sec. The results of the scratch and mar tests are given in Table 5.

number average molecular weights, on the scratch and mar resistance of a composition containing 10% rubber and a graft copolymer comprising a propylene homopolymer backbone to which was grafted a MMA/MeAc copolymer.

The graft copolymer was prepared as described in Example 1.

The graft copolymer was blended with the BMWD PP as described in Example 1. The amounts of the BMWD PP and the other components of the compositions are given in Table 6.

Polywax 3000 polyethylene was described in Example 1. Polywax 850 polyethylene was described in Example 5. Polywax 2000 polyethylene is a fully saturated homopolymer having a melting point of 126° C. and a $M_n$ of 2000. The rubber, the BMWD PP, the black pigment, and the stabilizer master batch were described in Example 1.

The samples were compounded on a 34 mm co-rotating, intermeshing Leistritz twin screw extruder at a melt tem-

TABLE 5

| Sample | Comp. | 1 | 2 | 3 | 4 | 5 | 6 | 7 | 8 |
|---|---|---|---|---|---|---|---|---|---|
| Additive type | — | P-wax 3000 | P-wax 850 | Unilin 700 | Unithox 720 | Unicid 700 | X-5005 | X-2025 | X-2026 |
| MA/MeAc graft copolymer (wt. %) | 42.13 | 38.11 | 38.11 | 38.11 | 38.11 | 38.11 | 38.11 | 38.11 | 38.11 |
| BMWD PP rubber (wt. %) | 46.82 | 42.34 | 42.34 | 42.34 | 42.34 | 42.34 | 42.34 | 42.34 | 42.34 |
| Rubber (wt. %) | 10 | 10 | 10 | 10 | 10 | 10 | 10 | 10 | 10 |
| Ceramic microspheres | 0 | 2.5 | 2.5 | 2.5 | 2.5 | 2.5 | 2.5 | 2.5 | 2.5 |
| Maleated PP (wt. %) | 0 | 1.0 | 1.0 | 1.0 | 1.0 | 1.0 | 1.0 | 1.0 | 1.0 |
| Additive (wt. %) | 0 | 5 | 5 | 5 | 5 | 5 | 5 | 5 | 5 |
| Stabilizer master batch (wt. %) | 1.05 | 1.05 | 1.05 | 1.05 | 1.05 | 1.05 | 1.05 | 1.05 | 1.05 |
| Black pigment (pph) | 3 | 3 | 3 | 3 | 3 | 3 | 3 | 3 | 3 |
| Initial gloss (20°) (%) | 79 | 75 | 77 | 76 | 77 | 77 | 78 | 78 | 78 |
| Chrysler crocking gloss (20°) (%) | 0.2 | 67 | 55.2 | 68.3 | 64 | 20.2 | 31.2 | 10.9 | 31.1 |
| Ford crocking gloss (20°) (%) | 4.3 | 41.4 | 13.4 | 33.0 | 14.1 | 9.6 | 21.0 | 15.0 | 25.4 |
| Gloss retention (%) | 5 | 55 | 17 | 43 | 18 | 12 | 27 | 19 | 33 |
| Gloss retention (%) | 5 | 55 | 17 | 43 | 18 | 12 | 27 | 19 | 33 |
| Ford 5 finger scratch (7, 6, 3, 2, 0.6 N) | 54332 | 53222 | 53221 | 32121 | 22111 | 42221 | 43221 | 54222 | 53222 |
| Ford 5 finger mar (7, 6, 3, 2, 0.6 N) | 33332 | 32222 | 22222 | 11112 | 22222 | 21111 | 222222 | 11111 | 12111 |

The data show that scratch and mar resistance are improved by the addition of a combination of ceramic microspheres and a variety of low molecular weight polyethylenes, both linear and branched, and functionalized or unfunctionalized.

EXAMPLE 6

This example describes the effect of various amounts of low molecular weight polyethylenes having three different perature of 269°–275° C., a screw speed of 250 rpm, and a throughput rate of 20 lb/hr. Vacuum was used during extrusion.

Test bars were molded on a 5 oz. Battenfeld injection molding machine at a melt temperature of 450° F. and a mold temperature of 150° F. Plaques for scratch and mar testing were molded as described in Example 1. The results of the scratch and mar tests are given in Table 6.

TABLE 6

| Sample | Comp. | 1 | 2 | 3 | 4 | 5 | 6 | 7 |
|---|---|---|---|---|---|---|---|---|
| Graft copolymer (wt. %) | 42.13 | 41.66 | 40.95 | 40.24 | 39.77 | 37.4 | 39.77 | 39.77 |
| BMWD PP (wt. %) | 46.82 | 46.29 | 45.5 | 44.71 | 44.18 | 41.55 | 44.18 | 44.18 |
| Rubber (wt. %) | 10 | 10 | 10 | 10 | 10 | 10 | 10 | 10 |
| P-wax 3000 (wt. %) | 0 | 1 | 2.5 | 4 | 5 | 10 | 0 | 0 |
| P-wax 2000 (wt. %) | 0 | 0 | 0 | 0 | 0 | 0 | 5 | 0 |
| P-wax 850 (wt. %) | 0 | 0 | 0 | 0 | 0 | 0 | 0 | 5 |
| Stabilizer master batch (wt. %) | 1.05 | 1.05 | 1.05 | 1.05 | 1.05 | 1.05 | 1.05 | 1.05 |
| Black pigment (pph) | 3 | 3 | 3 | 3 | 3 | 3 | 3 | 3 |
| Notched Izod (ft-lb/in) | 2.43 | 2.94 | 2.62 | 2.58 | 4.28 | 2.46 | 2.8 | 2.3 |
| Tensile strength (psi) | 4525 | 4540 | 4460 | 4569 | 4544 | 4510 | 4506 | 4457 |
| Elongation to yield (%) | 6.3 | 6.3 | 6.3 | 6.2 | 6.3 | 6.1 | 6.3 | 6.5 |
| Elongation to break (%) | 130 | 142 | 135 | 77 | 67 | 34 | 86 | 143 |
| Flexural modulus (0.05"/min) (kpsi) | 224 | 225 | 216 | 222 | 220 | 215 | 216 | 206 |
| Flexural strength (0.05"/min) (psi) | 6458 | 6484 | 6213 | 6425 | 6342 | 6119 | 6195 | 5979 |
| Initial gloss (20°) (%) | 79 | 79 | 78 | 76 | 78 | 79 | 72 | 79 |

TABLE 6-continued

| Sample | Comp. | 1 | 2 | 3 | 4 | 5 | 6 | 7 |
|---|---|---|---|---|---|---|---|---|
| Chrysler crocking gloss (20°) (%) | 0.4 | 0.4 | 0.6 | 17.5 | 24 | 15.2 | 27.3 | 13.9 |
| Gloss retention (%) | 0.5 | 0.5 | 0.8 | 23.0 | 30.8 | 19.2 | 37.9 | 17.6 |
| Ford crocking gloss (20°) (%) | 1.1 | 1.4 | 5.7 | 5.5 | 3.8 | 4.8 | 4.5 | 4.8 |
| Gloss retention (%) | 1 | 2 | 7 | 7 | 5 | 6 | 6 | 6 |
| Ford 5 finger scratch (7, 6, 3, 2, 0.6 N) | 55433 | 55432 | 44322 | 44322 | 33222 | 43222 | 32221 | 43211 |
| Ford 5 finger mar (7, 6, 2, 3, 0.6 N) | 43321 | 43211 | 33111 | 21111 | 21111 | 11111 | 11111 | 21111 |

The data show that the degree of scratch and mar resistance improves as the amount of low molecular weight polyethylene increases and that scratch/mar performance is improved relative to the comparative example at each molecular weight.

EXAMPLE 7

This example describes the effect of various amounts of low molecular weight polyethylene on the scratch and mar resistance of a composition containing 2.5% ceramic microspheres, 1% maleated polypropylene, 10% rubber, and a graft copolymer comprising a propylene homopolymer backbone to which was grafted a MMA/MeAc copolymer.

The preparation of the graft copolymer and blending with the BMWD PP were described in Example 1. The compounding and molding of the samples were described in Example 6.

The ceramic microspheres and the maleated polypropylene compatibilizer were described in Example 5. The polyethylene wax was Polywax 3000 polyethylene and was described in Example 1. The other components of the compositions were the same as in Example 6 and the amounts of each are shown in Table 7. The results of the scratch and mar testing are shown in Table 7.

TABLE 7

| Sample | Comp. | 1 | 2 | 3 | 4 |
|---|---|---|---|---|---|
| Graft copolymer (wt. %) | 40.48 | 40.00 | 39.29 | 38.58 | 38.11 |
| BMWD PP (wt. %) | 44.97 | 44.45 | 43.66 | 42.87 | 42.34 |
| Rubbert (wt. %) | 10 | 10 | 10 | 10 | 10 |
| Ceramic microspheres (wt. %) | 2.5 | 2.5 | 2.5 | 2.5 | 2.5 |
| Maleated PP (wt. %) | 1.0 | 1.0 | 1.0 | 1.0 | 1.0 |
| Polyethylene wax (wt. %) | 0 | 1 | 2.5 | 4 | 5 |
| Stabilizer master batch (wt. %) | 1.05 | 1.05 | 1.05 | 1.05 | 1.05 |
| Black pigment (pph) | 3 | 3 | 3 | 3 | 3 |
| Notched Izod (ft-lb/in) | 2.2 | 2.06 | 2.28 | 2.23 | 2.31 |
| Tensile strength (psi) | 4458 | 4467 | 4450 | 4473 | 4502 |
| Elongation to yield (5) | 6.3 | 6.3 | 6.6 | 6.4 | 6.4 |
| Elongation to break (%) | 137 | 107 | 108 | 77 | 58 |
| Flexural modulus (0.05"/min) (kpsi) | 218 | 218 | 216 | 217 | 215 |
| Flexural strength (0.05"/min) (psi) | 6221 | 6214 | 6144 | 6177 | 6171 |
| Initial gloss (20°) (%) | 78 | 77 | 72 | 72 | 76 |
| Chrysler crocking gloss (20°) (%) | 0.8 | 1.1 | 1.7 | 33.3 | 53.2 |
| Gloss retention (%) | 1.0 | 1.4 | 2.4 | 46.3 | 70.0 |
| Ford crocking gloss (20°) (%) | 2.1 | 6.6 | 8.9 | 11.4 | 35.9 |
| Gloss retention (%) | 3 | 9 | 12 | 16 | 47 |
| Ford 5 finger scratch (7, 6, 3, 2, 0.6 N) | 55432 | 43322 | 43322 | 43322 | 54322 |
| Ford 5 finger mar (7, 6, 3, 2, 0.6 N) | 43111 | 32111 | 32111 | 32111 | 43211 |

The data show that the degree of scratch and mar resistance improves as the amount of low molecular weight polyethylene increases.

EXAMPLE 8

This example describes the effect of various amounts of ceramic microspheres, with and without a maleated polypropylene compatibilizing agent, on the scratch and mar resistance of a composition containing 5% of a low molecular weight polyethylene, 10% rubber, and a graft copolymer comprising a propylene homopolymer backbone to which was grafted a MMA/MeAc copolymer.

The preparation of the graft copolymer and blending with the BMWD PP were described in Example 1. The samples were compounded on a 40 mm co-rotating, intermeshing Werner-Pfleider twin screw extruder.

Test bars were molded on a 5 oz. Battenfeld injection molding machine at a melt temperature of 450° F. The mold temperature for all samples was 150° F. The plaques for scratch/mar testing were molded as described in Example 1.

The ceramic microspheres and the maleated polypropylene were described in Example 5. The other components of the composition were the same as in Example 1 and the amounts of each are shown in Table 8. The results of the physical property testing and the scratch and mar testing are shown in Table 8.

TABLE 8

| Sample | Comp. 1 | 1 | 2 | 3 |
|---|---|---|---|---|
| Graft copolymer (wt. %) | 42.13 | 38.58 | 37.40 | 36.45 |
| BMWD PP (wt. %) | 46.82 | 42.87 | 41.55 | 40.50 |

TABLE 8-continued

| Sample | Comp. 1 | 1 | 2 | 3 |
|---|---|---|---|---|
| Rubber (wt. %) | 10.00 | 10.00 | 10.00 | 10.00 |
| Maleated PP (wt. %) | 0 | 0 | 0 | 2.00 |
| Ceramic microspheres (wt. %) | 0 | 2.50 | 5.00 | 5.00 |
| Polyethylene wax (wt. %) | 0 | 5.00 | 5.00 | 5.00 |
| Stabilizer master batch (wt. %) | 1.05 | 1.05 | 1.05 | 1.05 |
| Black pigment (pph) | 3 | 3 | 3 | 3 |
| Notched Izod impact (ft. lb/in) | 4.39 | 2.81 | 2.0 | 2.3 |
| Tensile strength (psi) | 4492 | 4611 | 4370 | 4515 |
| Elongation to break (%) | 278 | 152 | 78 | 54 |
| Elongation to yield (%) | 6.76 | 6.4 | 6.5 | 6.6 |
| Flexural modulus (0.05"/min) (kpsi) | 210.8 | 217.9 | 214 | 210 |
| Flexural strength (0.05"/min) (psi) | 6169 | 6261 | 5930 | 6075 |
| Initial gloss (20° C.) (%) | 79.5 | 77.9 | 73 | 77 |
| Chrysler crocking gloss (20°) (%) | 0.3 | 31.8 | 62 | 65 |
| Gloss retention (%) | 0.4 | 40.8 | 85 | 84 |
| Ford crocking gloss (20°) (%) | 0.9 | 7.4 | 32 | 36 |
| Gloss retention (%) | 1.1 | 9.5 | 44 | 47 |

The data show that scratch/mar performance improves with increasing levels of ceramic microspheres and that the addition of maleated polypropylene does not reduce the benefit of a combination of polyethylene wax and ceramic microspheres.

EXAMPLE 9

This example describes the effect of various amounts of ceramic microspheres and compatibilizing agent on the scratch and mar resistance of a composition containing 5% rubber, 5% polyethylene wax, and a graft copolymer comprising a propylene homopolymer backbone, to which was grafted a MMA/MeAc copolymer.

The preparation of the graft copolymer and blending with the BMWD PP were described in Example 1.

The samples were compounded on a 40 mn co-rotating, intermeshing Werner-Pfleider twin screw extruder at a melt temperature of 300°–310° C., a screw speed of 400–500 rpm, and a throughput rate of 170–215 lb/hr. Extruder throughput and rpm were adjusted to achieve a product melt flow rate of 16–18 g/10 min at 230° C./3.8 kg. Vacuum was used during extrusion.

Test bars were molded on a 9 oz HPM injection molding machine at a melt temperature of 425° F. and a mold temperature of 140° F. Plaques for scratch/mar testing were molded on a 5 oz Battenfeld injection molding machine at a barrel temperature of 475° F., a mold temperature of 180° F., and an injection speed of 0.5"/sec.

The ceramic microspheres were X92 Zeeospheres and were described in Example 5. The maleated polypropylene was described in Example 5. The other components of the composition were the same as in Example 1 and the amounts of each are shown in Table 9. The results of the physical property testing and the scratch and mar testing are shown in Table 9.

TABLE 9

| Sample | 1 | 2 | 3 | 4 |
|---|---|---|---|---|
| Graft copolymer (wt. %) | 42.13 | 41.42 | 40.48 | 38.81 |
| BMWD PP (wt. %) | 46.82 | 46.03 | 44.97 | 43.14 |
| Rubber (wt. %) | 5 | 5 | 5 | 5 |
| Ceramic microspheres (wt. %) | 0 | 1 | 2.5 | 5 |
| Maleated PP (wt. %) | 0 | 0.5 | 1 | 2 |
| Polyethylene wax (wt. %) | 5 | 5 | 5 | 5 |
| Stabilizer master batch (wt. %) | 1.05 | 1.05 | 1.05 | 1.05 |
| Black pigment (pph) | 3 | 3 | 3 | 3 |
| Notched Izod (ft. lb/in) | 3.8 | 1.5 | 1.5 | 1.4 |
| Flexural modulus (kpsi) | 202.2 | 233.7 | 241 | 247.9 |
| Flexural strength (kpsi) | 5.81 | 6.81 | 6.91 | 7.05 |
| Initial gloss (20°) (%) | 79.8 | 79.1 | 78.5 | 66.9 |
| Chrysler crocking gloss (20°) (%) | 25.5 | 43.8 | 63.4 | 22.5 |
| Gloss retention (%) | 32.0 | 55.4 | 80.8 | 33.6 |
| Ford crocking gloss (20°) (%) | 13.6 | 21.7 | 32.0 | 21.9 |
| Gloss retention (%) | 17 | 27 | 41 | 33 |
| Ford 5 finger scratch (7,6,3,2,0.6 N) | 55332 | 55432 | 44332 | 44332 |
| Ford 5 finger mar (7,6,3,2,0.6 N) | 22222 | 22221 | 22222 | 22221 |

The data show that scratch/mar performance is improved by the addition of ceramic microspheres when the maleated polypropylene compatibilizing agent is present.

EXAMPLE 10

This example describes the effect of various amounts of ceramic microspheres and compatibilizing agent on the scratch and mar resistance of a composition containing 10% rubber, 5% polyethylene wax, and a graft copolymer comprising a propylene homopolymer backbone, to which was grafted a MMA/MeAc copolymer.

The preparation of the graft copolymer and blending with the BMWD PP were described in Example 1. The compounding and molding of the samples were described in Example 9.

The ceramic microspheres were X92 Zecospheres and were described in Example 5. The maleated polypropylene was described in Example 5. The other components of the compositions were the same as in Example 1 and the amounts of each are shown in Table 10. The results of the physical property testing and the scratch and mar testing are shown in Table 10.

TABLE 10

| Sample | 1 | 2 | 3 | 4 |
|---|---|---|---|---|
| Graft copolymer (wt. %) | 39.76 | 39.06 | 38.11 | 36.45 |
| BMWD PP (wt. %) | 44.19 | 43.39 | 42.34 | 40.5 |
| Rubber (wt. %) | 10 | 10 | 10 | 10 |
| Ceramic microspheres (wt. %) | 0 | 1 | 2.5 | 5 |
| Maleated PP (wt. %) | 0 | 0.5 | 1 | 2 |
| Polyethylene wax (wt. %) | 5 | 5 | 5 | 5 |
| Stabilizer master batch (wt. %) | 1.05 | 1.05 | 1.05 | 1.05 |
| Black pigment (pph) | 3 | 3 | 3 | 3 |
| Notched Izod (ft. lb/in) | 2.9 | 2.4 | 1.8 | 2 |
| Flexural modulus (kpsi) | 211.7 | 210.7 | 212.8 | 213.6 |
| Flexural strength (kpsi) | 6.15 | 6.14 | 6.15 | 6.13 |
| Initial gloss (20°) (%) | 80 | 79.5 | 76.8 | 76.2 |
| Chrysler crocking gloss (20°) (%) | 24.3 | 38.0 | 60.7 | 55.4 |
| Gloss retention (%) | 30.4 | 48.9 | 79.0 | 72.7 |
| Ford crocking gloss (20°) (%) | 7.4 | 9.9 | 39.4 | 31.1 |
| Gloss retention (%) | 9 | 12 | 51 | 41 |
| Ford 5 finger scratch (7,6,3,2,0.6 N) | 55333 | 55332 | 55332 | 55332 |
| Ford 5 finger mar (7,6,3,2,0.6 N) | 22222 | 22221 | 22221 | 22221 |

The data show that scratch/mar performance is improved even at low levels of ceramic microspheres and compatibilizing agent.

EXAMPLE 11

This example describes the effect of various amounts of ceramic microspheres and compatibilizing agent on the scratch and mar resistance of a composition containing 15% rubber, 5% polyethylene wax, and a graft copolymer comprising a propylene homopolymer backbone to which was grafted a MMA/MeAc copolymer.

The preparation of the graft copolymer and blending with the BMWD PP were described in Example 1. The compounding and molding of the samples were described in Example 9.

The ceramic microspheres were X92 Zeeospheres and were described in Example 5. The maleated polypropylene was described in Example 5. The other components of the composition were the same as in Example 1 and the amounts of each are shown in Table 11. The results of the physical property testing and the scratch and mar testing are shown in Table 11.

TABLE 11

| Sample | 1 | 2 | 3 | 4 |
|---|---|---|---|---|
| Graft copolymer (wt. %) | 37.4 | 36.69 | 35.74 | 34.08 |
| BMWD PP (wt. %) | 41.55 | 40.76 | 39.71 | 37.87 |
| Rubber (wt. %) | 15 | 15 | 15 | 15 |
| Ceramic microspheres (wt. %) | 9 | 1 | 2.5 | 5 |
| Maleated PP (wt. %) | 0 | 0.5 | 1 | 2 |
| Polyethylene wax (wt. %) | 5 | 5 | 5 | 5 |
| Stabilizer master batch (wt. %) | 1.05 | 1.05 | 1.05 | 1.05 |
| Black pigment (pph) | 3 | 3 | 3 | 3 |
| Notched Izod (ft. lb/in) | 13 | 10.4 | 12 | 6.2 |
| Flexural modulus (kpsi) | 180.2 | 189.7 | 187.2 | 194.6 |
| Flexural strength (kpsi) | 5.24 | 5.52 | 5.45 | 5.58 |
| Elongation to break (%) | 438 | 349 | 350 | 300 |
| Initial gloss (20°) (%) | 81.3 | 81 | 78.5 | 77.3 |
| Chrysler crocking gloss (20°) (%) | 2.6 | 8.3 | 39.3 | 12.6 |
| Gloss retention (%) | 3.2 | 10.2 | 50.1 | 16.3 |
| Ford crocking gloss (20°) (%) | 8.2 | 7.3 | 9.7 | 16.0 |
| Gloss retention (%) | 10 | 9 | 12 | 21 |
| Ford 5 finger scratch (7,6,3,2,0.6 N) | 55332 | 55332 | 55332 | 55332 |
| Ford 5 finger mar (7,6,3,2,0.6 N) | 22221 | 22221 | 22221 | 22222 |

The data show that scratch/mar performance is improved even at low levels of ceramic microspheres and compatibilizing agent.

EXAMPLE 12

This example describes the effect of various amounts of ceramic microspheres and compatibilizing agent on the scratch and mar resistance of a composition containing 20% rubber, 5% polyethylene wax, and a graft copolymer comprising a propylene homopolymer backbone to which was grafted a MMA/MeAc copolymer.

The preparation of the graft copolymer and blending with the BMWD PP were described in Example 1. The compounding and molding of the samples were described in Example 9.

The ceramic microspheres were X-92 Zeeospheres and were described in Example 5. The maleated polypropylene was described in Example 5. The other components of the compositions were the same as in Example 1 and the amounts of each are shown in Table 12. The results of the physical property testing and the scratch and mar testing are shown in Table 12.

TABLE 12

| Sample | 1 | 2 | 3 | 4 |
|---|---|---|---|---|
| Graft copolymer (wt. %) | 35.03 | 34.32 | 33.37 | 31.71 |
| BMWD PP (wt. %) | 38.92 | 38.13 | 37.08 | 35.24 |
| Rubber (wt. %) | 20 | 20 | 20 | 20 |
| Ceramic microspheres (wt. %) | 0 | 1 | 2.5 | 5 |
| Maleated PP (wt. %) | 0 | 0.5 | 1 | 2 |
| Polyethylene wax (wt. %) | 5 | 5 | 5 | 5 |
| Stabilizer master batch (wt. %) | 1.05 | 1.05 | 1.05 | 1.05 |
| Black pigment (pph) | 3 | 3 | 3 | 3 |
| Notched Izod (ft. lb/in) | 15.9 | 15 | 15.7 | 14.5 |
| Flexural modulus (kpsi) | 164 | 166.7 | 154.3 | 165.1 |
| Flexural strength (kpsi) | 4.81 | 4.84 | 4.49 | 4.76 |
| Initial gloss (20°) (%) | 78.2 | 77 | 78 | 76 |
| Chrysler crocking gloss (20°) (%) | 5.9 | 6.8 | 13.8 | 20.7 |
| Gloss retention (%) | 7.5 | 8.8 | 17.7 | 27.2 |
| Ford crocking gloss (20°) (%) | 5.1 | 7.8 | 10.6 | 8.1 |
| Gloss retention (%) | 7 | 10 | 14 | 11 |
| Ford 5 finger scratch (7,6,3,2,0.6 N) | 55443 | 55332 | 55332 | 55332 |
| Ford 5 finger mar (7,6,3,2,0.6 N) | 22222 | 22221 | 22222 | 22221 |

The data show that scratch/mar performance is improved even at low levels of ceramic microspheres and compatibilizing agent.

EXAMPLE 13

This example describes the effect of various amounts of two types of ceramic microspheres with a sizing agent and various amounts of a compatibilizing agent on the scratch and mar resistance of a composition containing 10% rubber, 5% polyethylene wax, and a graft copolymer comprising a propylene homopolymer backbone to which was grafted a MMA/MeAc copolymer.

The preparation of the graft copolymer and blending with the BMWD PP were described in Example 1.

The samples were compounded on a 34 mm co-rotating, intermeshing Leistritz twin screw extruder at a melt temperature of 250° C., a screw speed of 250 rpm, and a throughput rate of 23 lb/hr. Vacuum was used during extrusion.

Plaques for scratch/mar testing were molded on a 5 oz Battenfeld injection molding machine at a barrel temperature of 485° F., a mold temperature of 180° F., and an injection speed of 0.5"/sec.

The X-292 Zeeosphere ceramic microspheres were a silica-alumina ceramic alloy in which 90% by volume of the sample had a particle size of ≦5.0–6.2 μm, treated with Union Carbide A 1100 sizing agent. The X-293 Zeeosphere ceramic microspheres were a silica-alumina ceramic alloy in which 90% by volume of the sample had a particle size of ≦6.0–7.4 μm, treated with Union Carbide A 1100 sizing agent. Both are commercially available from Zeelan Industries, Inc.

The maleated polypropylene was described in Example 5. The other components of the compositions were the same as in Example 1 and the amounts of each are shown in Table 13. The results of the scratch and mar testing are shown in Table 13.

TABLE 13

| Sample | 1 | 2 | 3 | 4 | 5 | 6 | 7 |
| --- | --- | --- | --- | --- | --- | --- | --- |
| Graft copolymer (wt. %) | 39.76 | 39.05 | 38.11 | 36.45 | 39.05 | 38.11 | 36.45 |
| BMWD PP (wt. %) | 44.19 | 43.4 | 42.34 | 40.5 | 43.4 | 42.34 | 40.5 |
| Rubber (wt. %) | 10 | 10 | 01 | 10 | 10 | 10 | 10 |
| Ceramic microspheres (X292) (wt. %) | 0 | 1 | 2.5 | 5 | 0 | 0 | 0 |
| Ceramic microspheres (X293) (wt. %) | 0 | 0 | 0 | 0 | 1 | 2.5 | 5 |
| Maleated PP (wt. %) | 0 | 0.5 | 1 | 2 | 0.5 | 1 | 2 |
| Polyethylene wax (wt. %) | 5 | 5 | 5 | 5 | 5 | 5 | 5 |
| Stabilizer master batch (wt. %) | 1.05 | 1.05 | 1.05 | 1.05 | 1.05 | 1.05 | 1.05 |
| Black pigment (pph) | 3 | 3 | 3 | 3 | 3 | 3 | 3 |
| Initial gloss (20°) (%) | 82.7 | 81.4 | 79.9 | 75.6 | 79 | 78.4 | 74.5 |
| Chrysler crocking gloss (20°) (%) | 23.4 | 52.0 | 65.8 | 60.4 | 62.5 | 69.2 | 44.3 |
| Gloss retention (%) | 28.3 | 64 | 82.8 | 79.9 | 79.1 | 88.3 | 59.5 |
| Ford crocking gloss (20°) (%) | 4.5 | 9.9 | 13.9 | 16.4 | 18.5 | 12.8 | 18.8 |
| Gloss retention (%) | 5.4 | 12.2 | 17.4 | 21.7 | 23.4 | 16.3 | 25.2 |
| Ford 5 finger scratch (7, 6, 3, 2, 0.6 N) | 53332 | 53332 | 54432 | 54432 | 54432 | 54432 | 53323 |
| Ford 5 finger mar (7, 6, 3, 2, 0.6 N) | 22221 | 22222 | 22122 | 22221 | 32222 | 22221 | 51431 |

The data show that ceramic microsphere diameter does not have a significant effect on scratch/mar resistance.

EXAMPLE 14

This example describes the effect of various amounts of X-61 Zeeosphere ceramic microspheres and compatibilizing agent on the scratch and mar resistance of a composition containing 10% rubber, 5% polyethylene wax, and a graft copolymer comprising a propylene homopolymer backbone, to which was grafted a MMA/MeAc copolymer.

The preparation of the graft copolymer and blending with the BMWD PP were described in Example 1. The compounding and molding of the samples were described in Example 13.

The X-61 Zeeospheres were a silica-alumina ceramic alloy in which 90% by volume of the sample had a particle size of $\leq 4.2$–$5.2$ $\mu$m, and they are commercially available from Zeelan Industries, Inc. The maleated polypropylene was described in Example 5. The other components of the composition were the same as in Example 1 and the amounts of each are shown in Table 14. The results of the scratch and mar testing are shown in Table 14.

TABLE 14

| Sample | 1 | 2 | 3 | 4 |
| --- | --- | --- | --- | --- |
| Graft copolymer (wt. %) | 39.76 | 39.05 | 38.11 | 36.45 |
| BMWD PP (wt. %) | 44.19 | 43.4 | 42.34 | 40.5 |
| Rubber (wt. %) | 10 | 10 | 10 | 10 |
| Ceramic microspheres (X61) (wt. %) | 0 | 1 | 2.5 | 5 |
| Maleated PP (wt. %) | 0 | 0.5 | 1 | 2 |
| Polyethylene wax (wt. %) | 5 | 5 | 5 | 5 |
| Stabilizer master batch (wt. %) | 1.05 | 1.05 | 1.05 | 1.05 |
| Black pigment (pph) | 3 | 3 | 3 | 3 |
| Initial gloss (20°) (%) | 82.7 | 80.2 | 80 | 77 |
| Chrysler crocking gloss (20°) (%) | 23.4 | 28.5 | 59.6 | 63.9 |
| Gloss retention (%) | 28.3 | 35.5 | 74.5 | 83 |
| Ford crocking gloss (20°) (%) | 4.5 | 6.6 | 9.6 | 12.7 |
| Gloss retention (%) | 5.4 | 8.2 | 12 | 16.5 |
| Ford 5 finger scratch (7,6,3,2,0.6 N) | 53332 | 53323 | 53323 | 53323 |
| Ford 5 finger mar (7,6,3,2,0.6 N) | 22221 | 51431 | 51431 | 52432 |

The data show that small ceramic microspheres are effective and that scratch/mar performance improves as the level of microspheres increases.

EXAMPLE 15

This example describes the effect of using various types of inorganic microspheres, with and without a maleated polypropylene coupling agent, on the scratch and mar resistance of a composition containing 10% rubber, 5% polyethylene wax, and a graft copolymer comprising a propylene homopolymer backbone, to which was grafted a MMA/MeAc copolymer.

The preparation of the graft copolymer and blending with the BMWD PP were described in Example 1. The compounding of the samples was the same as described in Example 5, except that the melt temperature was ~240° C. The plaques for scratch/mar testing were molded as described in Example 1.

The BMWD PP, the rubber, the polyethylene wax, the stabilizer master batch, and the black pigment were described in Example 1. The maleated polypropylene was described in Example 5. The white pigment was RCL6 white pigment, commercially available from Millenium.

The W210 Zeeospheres were alkali aluminosilicate ceramic microspheres in which 90% by volume of the sample had a particle size of $\leq 11$ $\mu$m, and they are commercially available from Zeelan Industries, Inc. The X273 Zeeospheres were an alkali aluminosilicate ceramic in which 90% by volume of the sample had a particle size of $\leq 6.0$–$7.4$ $\mu$m, also commercially available from Zeelan Industries, Inc. The Spheriglass 6000 glass spheres had a particle size distribution in which 90% by weight were finer than 15 $\mu$m and are commercially available from Potters Industries Inc.

The amount of each component and the results of the scratch and mar testing are shown in Table 15.

TABLE 15

| Sample | 1 | 2 | 3 | 4 | 5 | 6 | 7 |
|---|---|---|---|---|---|---|---|
| Graft copolymer (wt. %) | 39.77 | 38.11 | 38.11 | 39.29 | 39.77 | 38.11 | 38.11 |
| BMWD PP (wt. %) | 44.18 | 42.34 | 42.34 | 43.66 | 44.18 | 42.34 | 42.34 |
| Rubber (wt. %) | 10 | 10 | 10 | 10 | 10 | 10 | 10 |
| Ceramic microspheres (W210) (wt. %) | — | 2.5 | — | — | — | 2.5 | — |
| Ceramic microspheres (W273) (wt. %) | — | — | 2.5 | — | — | — | 2.5 |
| Glass micropheres (wt. %) | — | — | — | 2.5 | — | — | — |
| Maleated PP (wt. %) | — | 1 | 1 | 1 | — | 1 | 1 |
| Polyethylene wax (wt. %) | 5 | 5 | 5 | 5 | 5 | 5 | 5 |
| Stabilizer master batch (wt. %) | 1.05 | 1.05 | 1.05 | 1.05 | 1.05 | 1.05 | 1.05 |
| Black pigment (pph) | — | — | — | — | 3 | 3 | 3 |
| White pigment (pph) | 3 | 3 | 3 | 3 | — | — | — |
| Initial gloss (20°) (%) | 79.2 | 79.4 | 79.3 | 79.5 | 77.4 | 77.4 | 78 |
| Chrysler crocking gloss (20°) (%) | 17.7 | 56.7 | 56.4 | 65.2 | 12.4 | 3.7 | 35.6 |
| Gloss retention (%) | 22.3 | 71.4 | 71.1 | 82 | 16 | 56.5 | 45.6 |
| Ford crocking gloss (20°) (%) | 8.2 | 18.7 | 25.4 | 28 | 4.5 | 12.5 | 9.8 |
| Gloss retention (%) | 10.4 | 23.6 | 22 | 35.2 | 5.8 | 16.1 | 12.6 |
| Ford 5 finger scratch (7, 6, 3, 2, 0.6 N) | 44322 | 44432 | 44332 | 44321 | 44332 | 44322 | 44322 |
| Ford 5 finger mar (7, 6, 3, 2, 0.6 N) | 11221 | 11111 | 11111 | 11111 | 11111 | 11111 | 11111 |

The data show that the scratch/mar performance is improved by the addition of the two types of alkali aluminosilicate ceramic microspheres as well as by the addition of the glass microspheres.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A composition comprising, by weight,
   (a) a graft copolymer comprising a backbone of a propylene polymer material having graft polymerized thereto at least one vinyl monomer capable of being polymerized by free radicals, wherein the polymerized monomers are present in an amount of about 10 to about 120 parts per hundred parts of the propylene polymer material, and
   (b) an additive selected from the group consisting of (i) about 0.5% to about 10% of at least one low molecular weight ethylene polymer or a functionalized derivative thereof having a number average molecular weight of about 300 to about 5000, and (ii) a combination of about (1) 0.5% to about 10% of at least one of the low molecular weight ethylene polymers in (i) and (2) about 0.5% to about 10% of inorganic microspheres, based on the total weight of the composition.

2. The composition of claim 1 wherein the propylene polymer material is selected from the group consisting of:
   (a) a homopolymer of propylene having an isotactic index greater than 80;
   (b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;
   (c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85; the maximum polymerized ethylene content is 5% by weight, the terpolymer having an isotactic index greater than 85;
   (d) an olefin polymer composition comprising:
      (i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;
      (ii) about 5% to about 25% by weight of a copolymer of ethylene and propylene or a 4–8 C alpha-olefin that is insoluble in xylene at ambient temperature; and
      (iii) about 30% to about 70% by weight of an elastomeric copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in tetrahydronaphthalene at 135° C., of about 1.5 to about 4.0 dl/g,
   wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and
   (e) a thermoplastic olefin comprising:
      (i) about 10% to about 60%, of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;

(ii) about 20% to about 60% of an amorphous copolymer from monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and (iii) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

3. The composition of claim 2 wherein the propylene polymer material is a propylene homopolymer.

4. The composition of claim 1 wherein the vinyl monomers are selected from the group consisting of (a) methyl methacrylate and methyl acrylate and (b) methyl methacrylate and methacrylic acid.

5. The composition of claim 1 that additionally comprises about 0.2% to about 4%, based on the total weight of the composition, of a compatibilizing agent comprising an acid-functionalized propylene polymer.

6. The composition of claim 1 that additionally comprises about 2% to about 30%, based on the total weight of the composition, of at least one rubber component selected from the group consisting of (a) an olefin copolymer rubber, (b) a monoalkenyl aromatic hydrocarbon-conjugated diene block copolymer, and (c) a core-shell rubber.

7. The composition of claim 1 that additionally comprises about 15% to about 50%, based on the total weight of the composition, of a broad molecular weight distribution propylene polymer material.

8. The composition of claim 6 that additionally comprises about 15% to about 50%, based on the total weight of the composition, of a broad molecular weight distribution propylene polymer material.

9. A process for improving the scratch and mar resistance of a graft copolymer comprising mixing (a) a graft copolymer comprising a backbone of a propylene polymer material having graft polymerized thereto at least one vinyl monomer capable of being polymerized by free radicals, wherein the polymerized monomers are present in an amount of about 10 to about 120 parts per hundred parts of the propylene polymer material, and (b) an additive selected from the group consisting of (i) about 0.5% to about 10% of at least one low molecular weight ethylene polymer or a functionalized derivative thereof having a number average molecular weight of about 300 to about 5000, and (ii) a combination of (1) about 0.5% to about 10% of at least one of the low molecular weight ethylene polymers in (i) and (2) about 0.5% to about 10% of inorganic microspheres, based on the total weight of the composition.

10. The process of claim 9 wherein the propylene polymer material is selected from the group consisting of:

(a) a homopolymer of propylene having an isotactic index greater than 80;

(b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:
(i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;

(ii) about 5% to about 25% by weight of a copolymer of ethylene and propylene or a 4–8 C alpha-olefin that is insoluble in xylene at ambient temperature; and (iii) about 30% to about 70% by weight of an elastomeric copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in tetrahydronaphthalene at 135° C., of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
(i) about 10% to about 60%, of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;

(ii) about 20% to about 60% of an amorphous copolymer from monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and (iii) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

11. The process of claim 10 wherein the propylene polymer material is a propylene homopolymer.

12. The process of claim 9 wherein the vinyl monomers are selected from the group consisting of (a) methyl methacrylate and methyl acrylate and (b) methyl methacrylate and methacrylic acid.

13. The process of claim 9 wherein about 0.2% to about 4%, based on the total weight of the composition, of a compatibilizing agent comprising an acid-functionalized propylene polymer is added.

14. An article made from the composition of claim 1.

15. The article of claim 14 produced by thermoforming, injection molding, sheet extrusion, profile extrusion, or blow molding.

* * * * *